US011120458B2

(12) United States Patent
Tian et al.

(10) Patent No.: US 11,120,458 B2
(45) Date of Patent: Sep. 14, 2021

(54) GROUP-BASED SEQUENTIAL RECOMMENDATIONS (71) Applicant: INTERNATIONAL BUSINESS MACHINES CORPORATION, Armonk, NY (US)

(72) Inventors: Tian Tian, Beijing (CN); Hong Min, Poughkeepsie, NY (US); Gong Su, New York, NY (US); Jie Xu, Beijing (CN); Chi Liu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 687 days.

(21) Appl. No.: 15/916,457

(22) Filed: Mar. 9, 2018

(65) Prior Publication Data
US 2019/0281407 A1    Sep. 12, 2019

(51) Int. Cl.
*H04W 4/021*     (2018.01)
*G06Q 30/02*     (2012.01)
(Continued)

(52) U.S. Cl.
CPC ..... *G06Q 30/0205* (2013.01); *G06F 16/9024* (2019.01); *G06F 16/9027* (2019.01);
(Continued)

(58) Field of Classification Search
None
See application file for complete search history.

(56) References Cited

U.S. PATENT DOCUMENTS 8,645,366 B1    2/2014  Acharya
2014/0358836 A1  12/2014  Moore et al.
(Continued)

FOREIGN PATENT DOCUMENTS

WO    2016166309 A1    10/2016

OTHER PUBLICATIONS

"A Method for Social and Location-aware group sequential recommendation" ip.com Prior Art Database Technical Disclosure Paper No. IPCOM00025266D published Feb. 1, 2018, pp. 1-3 (https://ip.com/IPCOM/000252662) (Year: 2018).*
(Continued)

*Primary Examiner* — Lynda Jasmin
*Assistant Examiner* — Laura Yesildag
(74) *Attorney, Agent, or Firm* — Cantor Colburn LLP; Margaret McNamara (57) ABSTRACT

Systems, methods, and computer-readable media for generating group-based sequential point-of-interest (POI) recommendations are disclosed. A primitive graph or sparse transition matrix is constructed that represents relationships between users, between POIs, and between users and POIs. A loss data prediction algorithm is executed on the primitive graph to obtain a filled graph, which may be a filled user-POI bipartite graph. A group sequential recommendation engine then performs an iterative sequential recommendation process that involves performing, at each iteration, various manipulations on the filled graph to obtain first a homogenous node type graph and then a minimum spanning tree. A next POI to recommend in a sequence of POIs is then determined from the minimum spanning tree. The iterative process continues until stopping criteria is met.

17 Claims, 6 Drawing Sheets

(51) Int. Cl.
 H04L 29/08 (2006.01)
 G06F 16/901 (2019.01)
 G06Q 50/00 (2012.01)
(52) U.S. Cl.
 CPC ............. H04L 67/22 (2013.01); H04W 4/021 (2013.01); *G06Q 30/0269* (2013.01); *G06Q 50/01* (2013.01)

(56) References Cited

U.S. PATENT DOCUMENTS

| | | | |
|---|---|---|---|
| 2015/0106366 A1* | 4/2015 | Stuttle | G06Q 50/01 707/732 |
| 2017/0046802 A1 | 2/2017 | Zhang et al. | |
| 2017/0161651 A1* | 6/2017 | Demarchi | G06F 16/9535 |
| 2017/0206276 A1 | 7/2017 | Gill et al. | |
| 2018/0137204 A1* | 5/2018 | Zhang | G06F 16/29 |

OTHER PUBLICATIONS

G. M. Minal and D. R. Patil, "Learning collective behavior of social media using minimum spanning tree algorithm," 2015 2nd International Conference on Electronics and Communication Systems (ICECS), Coimbatore, 2015, pp. 461-465, doi: 10.1109/ECS .2015. 7124947. (Year: 2015).*

Z. Wang, J. Juang and W. Teng, "Predicting POI visits with a heterogeneous information network," 2015 Conference on Technologies and Applications of Artificial Intelligence (TAAI), Tainan, 2015, pp. 388-395, doi: 10.1109/TAAI.2015.7407077. (Year: 2015).*

G. Christoforidis, P. Kefalas, A. Papadopoulos and Y. Manolopoulos, "Recommendation of Points-of-Interest Using Graph Embeddings," 2018 IEEE 5th International Conference on Data Science and Advanced Analytics (DSAA), Turin, Italy, 2018, pp. 31-40, doi: 10.1109/DSAA.2018.00013. (Year: 2018).*

H. Yin, X. Zhou, B. Cui, H. Wang, K. Zheng and Q. V. H. Nguyen, "Adapting to User Interest Drift for POI Recommendation," in IEEE Transactions on Knowledge and Data Engineering, vol. 28, No. 10, pp. 2566-2581, Oct. 1, 2016, doi: 10.1109/TKDE .2016. 2580511. (Year: 2016).*

P. Zhao et al., "Where to Go Next: A Spatio-Temporal Gated Network for Next POI Recommendation," in IEEE Transactions on Knowledge and Data Engineering, doi: 10.1109/TKDE.2020. 3007194. (Year: 2016).*

Z. Yu, H. Xu, Z. Yang and B. Guo, "Personalized Travel Package With Multi-Point-of-Interest Recommendation Based on Crowdsourced User Footprints," in IEEE Transactions on Human-Machine Systems, vol. 46, No. 1, pp. 151-158, Feb. 2016, doi: 10.1109/THMS. 2015.2446953. (Year: 2016).*

Q. Zhu, S. Wang, B. Cheng, Q. Sun, F. Yang and R. N. Chang, "Context-Aware Group Recommendation for Point-of-Interests," in IEEE Access, vol. 6, pp. 12129-12144, 2018, doi: 10.1109/ACCESS. 2018.2805701. (Year: 2018).*

Q. Xu, J. Wang and B. Xiao, "Personalized location recommendation for location-based social networks," 2017 IEEE/CIC International Conference on Communications in China (ICCC), Qingdao, 2017, pp. 1-6, doi: 10.1109/ICCChina.2017.8330459. (Year: 2017).*

Christoforidis, P. Kefalas, A. Papadopoulos and Y. Manolopoulos, "Recommendation of Points-of-Interest Using Graph Embeddings ," 2018 IEEE 5th International Conference on Data Science and Advanced Analytics (DSAA), Turin, Italy, 2018, pp. 31-40, doi: 10.1109/DSAA.2018.00013 (Year: 2018).*

Q. Xu, J. Wang and B. Xiao, "Personalized location recommendation for location-based social networks," 2017 IEEE/CIC International Conference on Communications in China (ICCC), 2017, pp. 1-6, doi: 10.1109/ICCChina.2017.8330459 (Year: 2017).*

Hakan Bagci et al, "Context-Aware Location Recommendation by Using a Random Walk-Based Approach", Knowledge and Information Systems, May 2016, vol. 47, Issue 2, pp. 241-260.

Josh Jia-Ching Ying, et al, "Mining User Check-In Behavior With a Random Walk for Urban Point-of-Interest Recommendations", vol. 5 Issue3, Sep. 2014 pp. 1-2.

Suchit Pongnumkul et. al, "Random Walk-Based Recommendation With Restart Using Social Information and Bayesian Transition Matrices", International Journal of Computer Applications (0975-8887); Volument 114—No. 9, Mar. 2015; pp. 32-36.

* cited by examiner

GROUP-BASED SEQUENTIAL RECOMMENDATIONS

BACKGROUND

The emergence of smart mobile devices coupled with improvements in wireless network accessibility has enabled users to determine their real-time location consistently and with ease. This development, in turn, has stimulated the emergence of location-based social network services (LBSN). LBSN services enable users to build social network connections and share interests and experiences relating to location-based activities including, for example, providing restaurant reviews, receiving restaurant recommendations, sharing real-time location-related information, or the like. In certain scenarios, users may desire group-based recommendations such as a movie recommendation for a group of friends with varied interests or a restaurant recommendation for a group of people with varied culinary tastes. Existing LBSN services and group recommendation techniques, however, suffer from a number of drawbacks, technical solutions to which are described herein.

SUMMARY

In one or more example embodiments of the invention, a method for generating group-based sequential point-of-interest (POI) recommendations is disclosed. The method includes determining, by a computer processor, a group of users and receiving, by the computer processor, a current input context for the group of users. The current input context includes a current group location for the group of users. The method further includes constructing, by the computer processor, a graph for the group of users, where the graph includes a set of user nodes and a set of POI nodes, each user node is associated with one or more POI nodes, and the current group location is represented in the graph by a node indicative of a current POI in a sequence of POIs. The method additionally includes performing, by the computer processor, an iterative process to determine the sequence of POIs to recommend to the group of users. Performing the iterative process includes determining, by the computer processor, a new current POI in the sequence of POIs based at least in part on the graph, and presenting, by the computer processor, an indication of the new current POI to the group of users. Performing the iterative process further includes updating, by the computer processor, the current input context, and modifying, by the computer processor, the graph to obtain a modified graph, where modifying the graph includes replacing the node indicative of the current POI with a node indicative of the new current POI. The iterative process is repeated until stopping criteria is met.

In one or more other example embodiments of the invention, a system for generating group-based sequential point-of-interest (POI) recommendations is disclosed. The system includes at least one memory storing computer-executable instructions and at least one processor configured to access the at least one memory and execute the computer-executable instructions to perform a set of operations. The operations include determining a group of users and receiving a current input context for the group of users. The current input context includes a current group location for the group of users. The set of operations further include constructing a graph for the group of users, where the graph includes a set of user nodes and a set of POI nodes, each user node is associated with one or more POI nodes, and the current group location is represented in the graph by a node indicative of a current POI in a sequence of POIs. The set of operations additionally include performing an iterative process to determine the sequence of POIs to recommend to the group of users. Performing the iterative process includes determining a new current POI in the sequence of POIs based at least in part on the graph, and presenting an indication of the new current POI to the group of users. Performing the iterative process further includes updating the current input context, and modifying the graph to obtain a modified graph, where modifying the graph includes replacing the node indicative of the current POI with a node indicative of the new current POI. The iterative process is repeated until stopping criteria is met.

In one or more other example embodiments of the invention, a computer program product for generating group-based sequential point-of-interest (POI) recommendations is disclosed. The computer program product includes a non-transitory storage medium readable by a processing circuit, the storage medium storing instructions executable by the processing circuit to cause a method to be performed. The method includes determining a group of users and receiving a current input context for the group of users. The current input context includes a current group location for the group of users. The method further includes constructing a graph for the group of users, where the graph includes a set of user nodes and a set of POI nodes, each user node is associated with one or more POI nodes, and the current group location is represented in the graph by a node indicative of a current POI in a sequence of POIs. The method additionally includes performing an iterative process to determine the sequence of POIs to recommend to the group of users. Performing the iterative process includes determining a new current POI in the sequence of POIs based at least in part on the graph, and presenting an indication of the new current POI to the group of users. Performing the iterative process further includes updating the current input context, and modifying the graph to obtain a modified graph, where modifying the graph includes replacing the node indicative of the current POI with a node indicative of the new current POI. The iterative process is repeated until stopping criteria is met.

BRIEF DESCRIPTION OF THE DRAWINGS

The detailed description is set forth with reference to the accompanying drawings. The drawings are provided for purposes of illustration only and merely depict example embodiments of the invention. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Example embodiments of the invention include, among other things, systems, methods, computer-readable media, techniques, and methodologies for providing a group of users having access to real-time location data with a sequence of point-of-interest (POI) recommendations. In certain example embodiments, raw user data and POI data may be used to generate a graph that represents relationships between users and POIs. More specifically, the generated graph may include user nodes representing users and POI nodes representing POIs. The graph may include edges between various nodes such as an edge between two user nodes, an edge between a user node and a POI node, and an edge between two POI nodes. An edge in the graph may indicate that a relationship exists between the nodes connected by the edge. User-to-user relationships may be determined, for example, from social media data and may reflect shared characteristics among users such as a shared preference for a particular type of cuisine. User-to-POI relationships may be determined, for example, from users' online activity including, without limitation, user reviews or ratings for POIs such as restaurants or event venues. POI-to-POI relationships may be determined, for example, from pre-defined relationships between POIs (e.g., proximity between POIs), from social media data (e.g., a correlation between user reviews for different POIs), or the like.

The graph initially generated from the raw user and POI data may be a primitive graph. A data loss prediction algorithm may be executed to fill in the graph with additional edges between user nodes, between POI nodes, and/or between user and POI nodes that may not have been identifiable based on the raw data. The data loss prediction algorithm may be a random walk with restart algorithm that predicts additional user-to-POI relationships based on relationships that have been identified from online user activity such as social media data. The filled-in graph may then be used to provide sequential POI recommendations to a group of users. In certain example embodiments, the primitive graph and/or the filled-in graph may be a user-POI bipartite graph.

The need for a group-based recommendation may arise in a number of scenarios. For example, a group of individuals with varied tastes or preferences may have difficulty arriving at a consensus on a movie to watch, deciding on a restaurant at which to eat, planning a travel schedule, or the like. In addition, in some scenarios, a sequential recommendation may be desired. For example, a group of tourists may seek a recommendation on a sequence of travel destinations to visit or a sequence of POIs to visit within a particular geographic region. Sequential recommendations may also arise in the context of deciding on a sequence of products to purchase (e.g., a product and its accessories).

Existing group-based recommendation services fail to, among other things, adequately leverage LBSN services and social media data to derive relationships between users, between POIs, and between users and POIs. Example embodiments, however, leverage such services and data to construct a graph representing the various user/POI relationships gleaned from the data and utilize the graph to provide sequential group-based POI recommendations that are more appropriately tailored to the attributes of the group, and thus, more likely to align with the collective tastes and preferences of the group. It should be appreciated that in certain example embodiments, a sequence of products/accessories may be recommended to a user or a group of users rather than a sequence of POIs. In such example embodiments, the graph utilized by the group sequential recommendation engine to determine the sequence of products/accessories may include nodes representative of the products/accessories in lieu of POI nodes and edges within the graph may represent user-to-user relationships, product/accessory-to-product/accessory relationships, and/or user-to-product/accessory relationships.

In one or more example embodiments, the group sequential recommendation engine may determine a group of users from raw user data. The group sequential recommendation engine may receive a user-POI bipartite graph for the group of users and an input context for the group of users as inputs. The input context may include a current location associated with the group of users. The group sequential recommendation engine may then modify the user-POI bipartite graph based at least in part on the current input context. In particular, the group sequential recommendation engine may modify the user-POI bipartite graph to include a user node representing the current group location as a current POI in the sequence of POIs to recommend. Further, in certain example embodiments, the user-POI bipartite graph received by the group sequential recommendation engine may include nodes for more users than are present in the identified group of users, in which case, the group sequential recommendation engine may modify the received graph to include only those user nodes corresponding to users in the group of users and related POI nodes. In other example embodiments, the group sequential recommendation engine may construct the user-POI bipartite graph for the group of users and related POIs responsive to receiving the indication of the group of users and the current input context.

After constructing or modifying the user-POI bipartite graph based at least in part on the current input context, the group sequential recommendation engine may convert the user-POI bipartite graph into a homogenous node type graph. The group sequential recommendation engine may then generate a minimum spanning tree from the homogenous graph and determine a new current POI from the minimum spanning tree. The group sequential recommendation engine may then present an indication of the new current POI to the group of users and update the current input context to reflect the new current POI as the current group location. This may include, for example, replacing the user node representing the previous POI in the recommended sequence of POIs with a user node representing the new current POI. The group sequential recommendation engine may then perform the above-described process iteratively to recommend, at each iteration, a new POI in the sequence until stopping criteria is met. The stopping criteria may include, for example, expiration of a remaining time for recommending a sequence of POIs to the group of users. The user group may specify the period of time during which it would like to receive sequential POI recommendations or it may be set by default. Additionally, a user may be provided with the capability to terminate the sequential POI recommendation process prematurely if so desired.

Various illustrative methods of the invention and corresponding data structures used in connection with the methods will now be described. It should be noted that each operation of one or more of the methods 400 or 500 may be performed by one or more of the engines, program modules, or the like depicted in FIG. 1, 2, or 6, whose operation will be described in more detail hereinafter. These engines, program modules, or the like may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments of the invention may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 1:
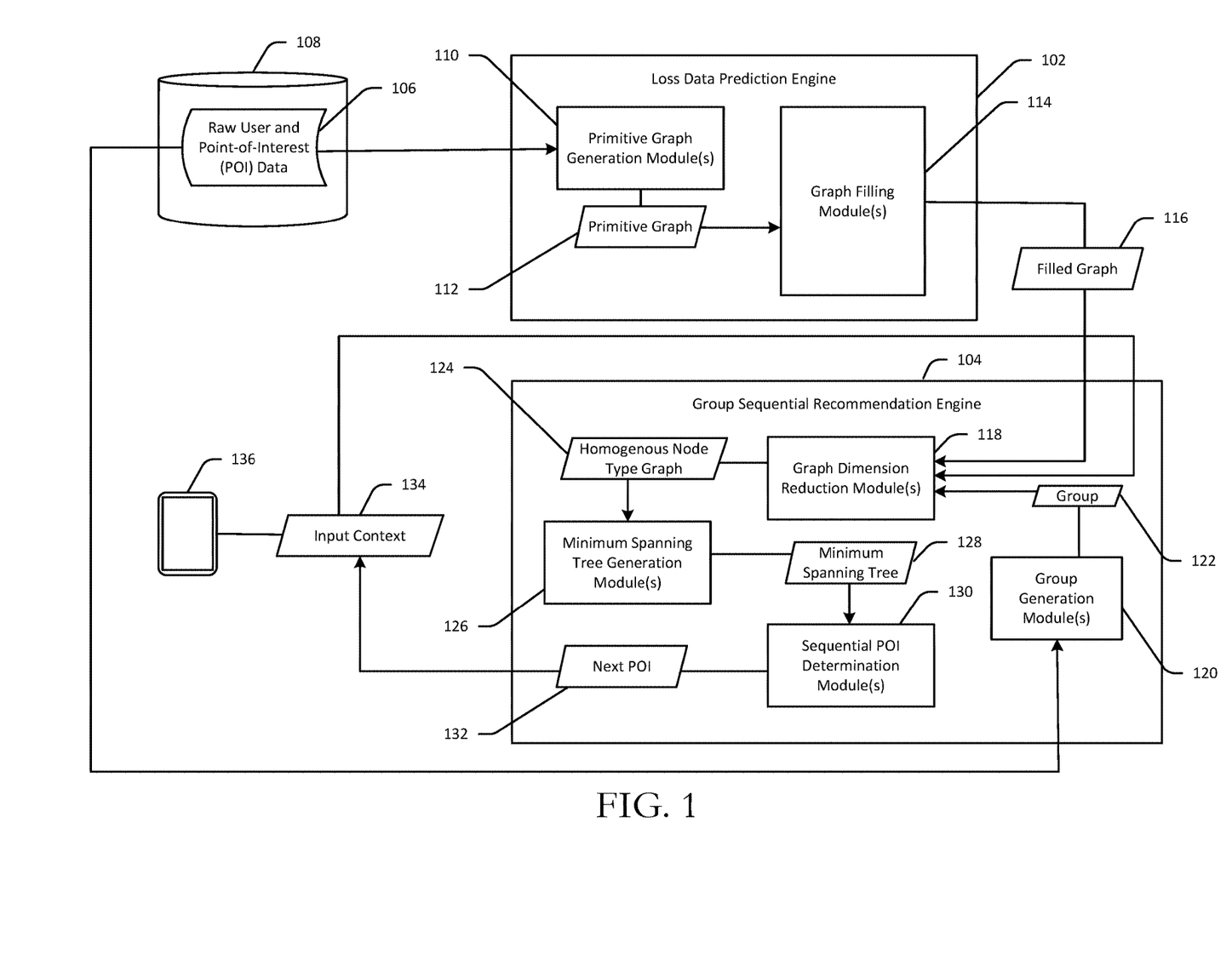
FIG. 1 is a schematic hybrid data flow and block diagram illustrating a group-based sequential POI recommendation process in accordance with one or more example embodiments.
Figure 2:
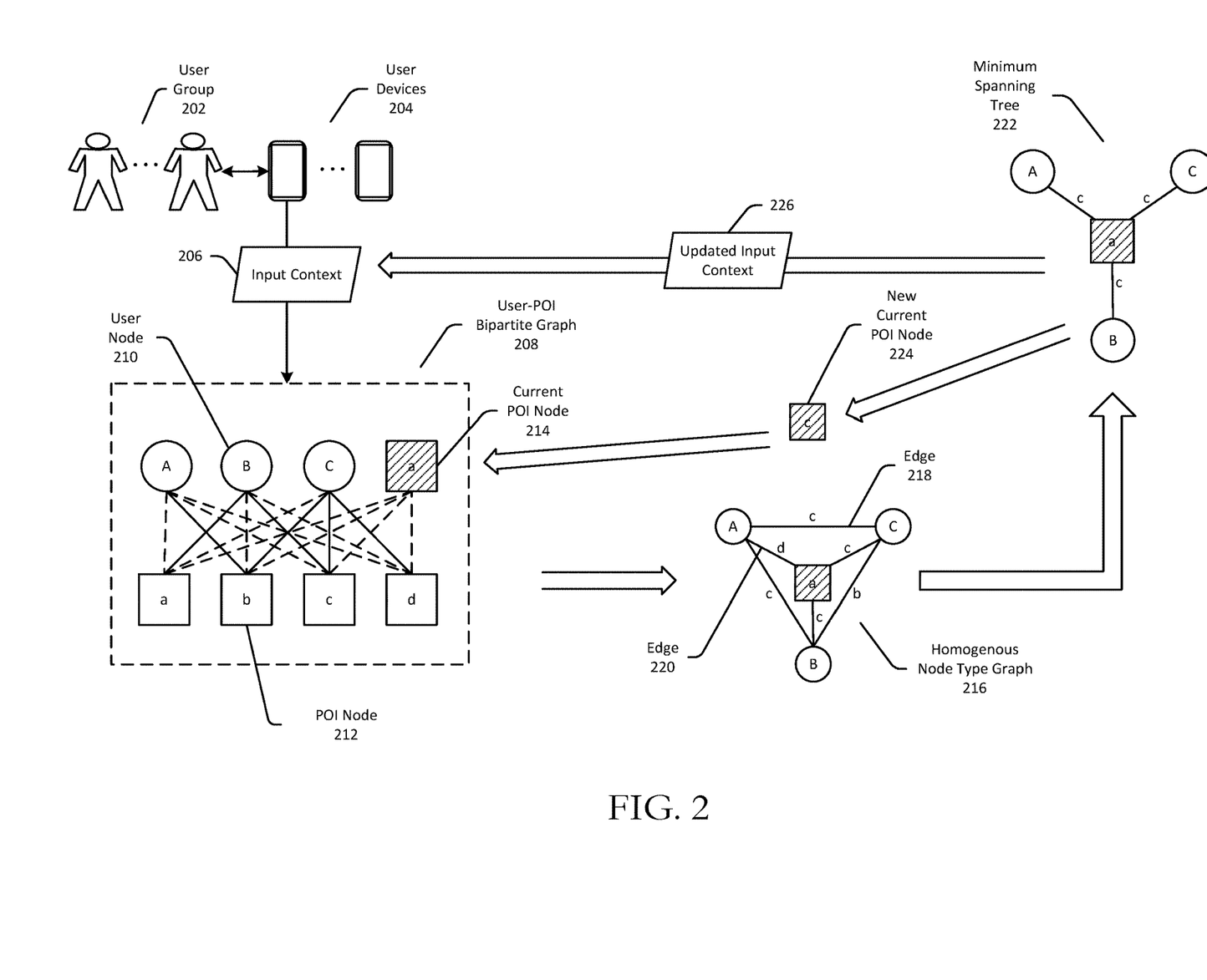
FIG. 2 is a more detailed schematic hybrid data flow and block diagram illustrating a group-based sequential POI recommendation process in accordance with one or more example embodiments.
Figure 3:
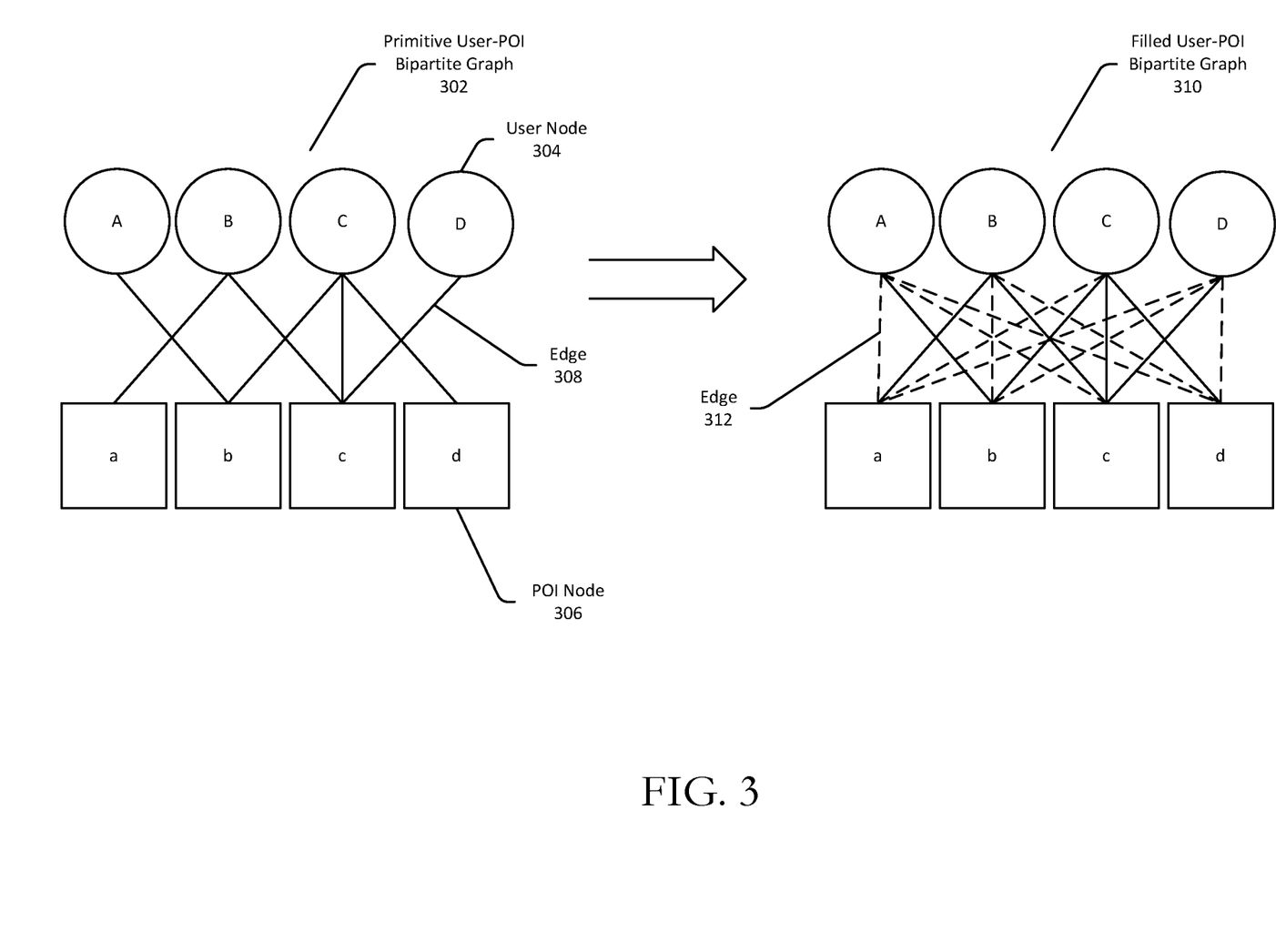
FIG. 3 illustrates data loss prediction in accordance with one or more example embodiments.
Figure 4:
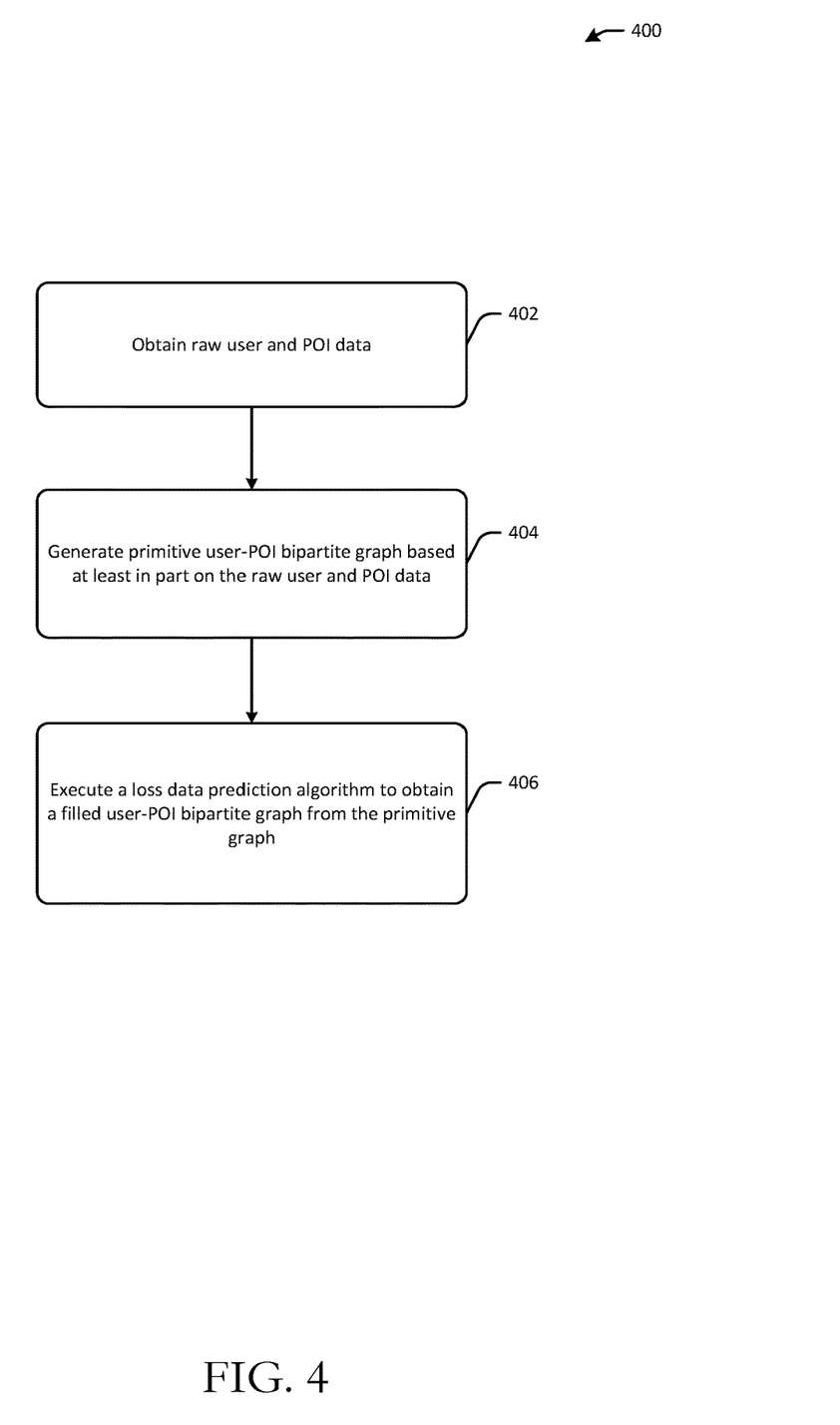
FIG. 4 is a process flow diagram of an illustrative method for performing data loss prediction to obtain a filled user-POI bipartite graph in accordance with one or more example embodiments.
Figure 5:
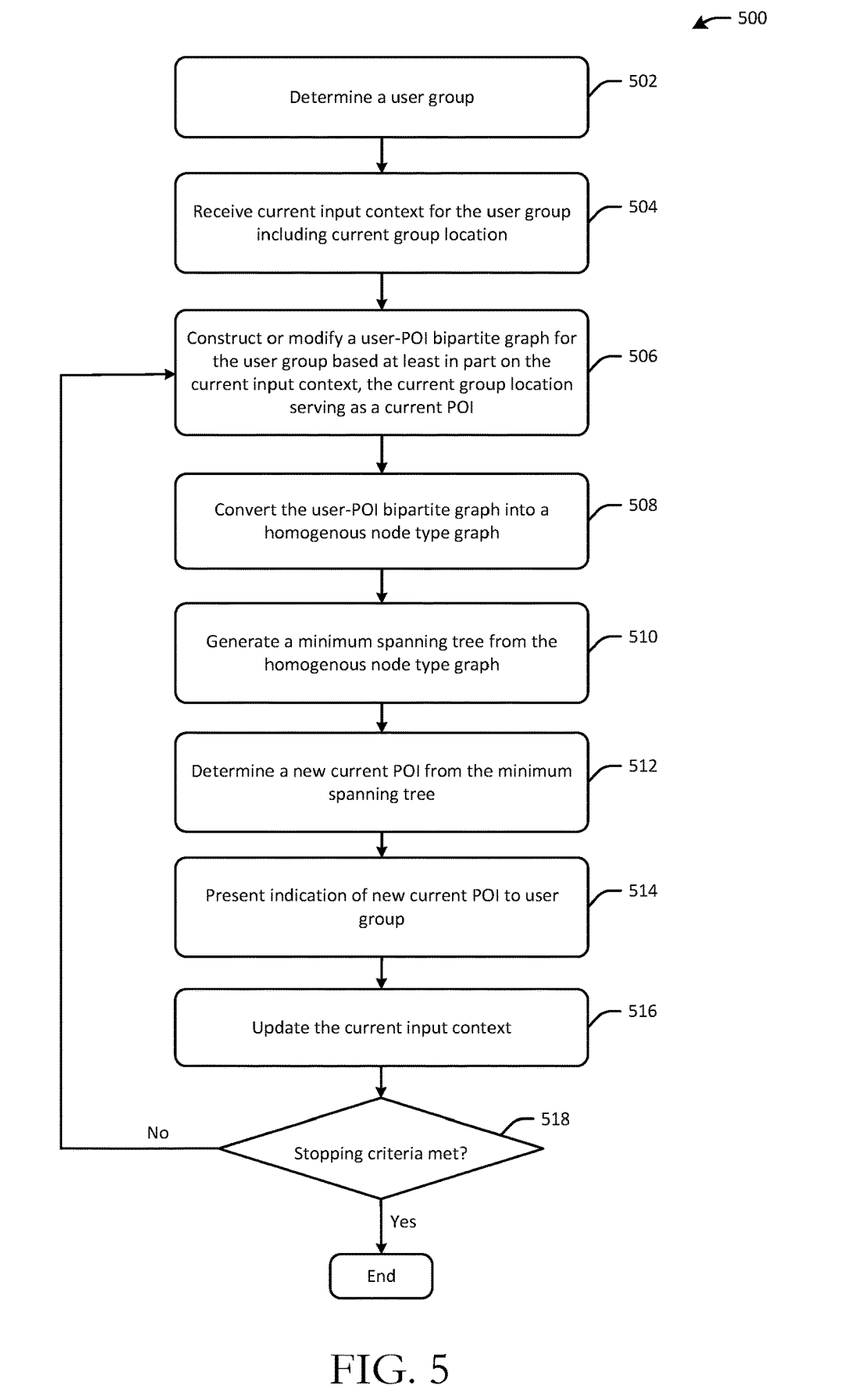
FIG. 5 is a process flow diagram of an illustrative method for determining a sequence of POIs to recommend to a group of users in accordance with one or more example embodiments.

FIG. 1 is a schematic hybrid data flow and block diagram illustrating a group-based sequential POI recommendation process. FIG. 2 is a more detailed schematic hybrid data flow and block diagram illustrating a group-based sequential POI recommendation process. FIG. 3 illustrates data loss prediction. FIG. 4 is a process flow diagram of an illustrative method 400 for performing data loss prediction to obtain a filled user-POI bipartite graph. FIG. 5 is a process flow diagram of an illustrative method 500 for determining a sequence of POIs to recommend to a group of users. FIGS. 1, 3, and 4 will be described in conjunction with one another hereinafter, while FIGS. 1, 2, and 5 will be described in conjunction with one another hereinafter.

Referring first to FIG. 1 in conjunction with FIGS. 3 and 4, at block 402 of the method 400, raw user and raw POI data 106 may be obtained. The raw data 106 may be stored in and accessed from one or more datastore(s) 108. The raw data 106 may include, without limitation, social media data for users such as online user comments, user reviews or ratings, or other online activity indicative of user tastes and preferences. The social media data for users may further include data indicative of social media connections, shared interests/hobbies/tastes/preferences between social media connections, and the like. The raw POI data 106 may include, without limitation, real-time status information for POIs, known relationships or shared attributes between POIs, or the like. For example, the raw POI data 106 may include information relating POIs based on their proximity or their shared attributes. For instance, two or more POIs that are within a certain threshold distance from one another may be related based on their proximity. As another non-limiting example, two or more POIs that share common attributes (e.g., historical sites that date to the same historical period and relate to the same historical society/culture; sporting venues; etc.) may be deemed related based on such shared common attributes. It should be appreciated that the above examples of raw user and POI data 106 are merely illustrative and not exhaustive.

Referring still to FIG. 1, a loss data prediction engine 102 may be provided. The loss data prediction engine 102 may receive the raw user and POI data 106 as input at block 402 of the method 400, and may generate a primitive graph 112 based at least in part on the received input at block 404 of the method 400. More specifically, referring to FIGS. 1 and 4, the loss data prediction engine 102 may include one or more primitive graph generation module(s) 110 that may be configured to receive the raw data 106 as input at block 402 of the method 400 and generate the primitive graph 112 based thereon at block 404 of the method 400. In certain example embodiments, the primitive graph 112 may be a user-POI bipartite graph.

An example primitive user-POI bipartite graph 302 is depicted in FIG. 3. The graph 302 may include a set of user nodes 304 and a set of POI nodes 306. Each user node 304 may represent a corresponding user for whom various social media data may be available in the raw data 106. More specifically, each user node 304 may represent a rating vector of n dimensions for a corresponding user, where each dimension may represent a rating by the user for a corresponding POI. It should be appreciated that the user rating vector embodied by a user node 304 may be a sparse vector where certain dimensions may have zero values indicating that no user rating data is available for the corresponding POIs.

Similarly, each POI node 306 may represent a feature vector of p dimensions for a corresponding POI. Each dimension of the feature vector may correspond to a label or attribute associated with the POI (e.g., "restaurant," "coffee, " etc.). Further, in certain example embodiments, a measure of popularity of a POI may be included as an attribute of the POI in the corresponding feature vector. The measure of popularity may be, for example, a number of user ratings/reviews that have been provided for the POI across one or more social media platforms. In other example embodiments, other values in the feature vector of a POI may be normalized based on the number of user ratings/reviews provided for the POI in lieu of, or in addition to, a popularity dimension being included in the feature vector.

As part of constructing the primitive user-POI bipartite graph 302 at block 404 of the method 400, the primitive graph generation module(s) 110 may determine relationships between users, relationships between POIs, and/or relationships between users and POIs. Relationships between users may be determined, for example, based on social media data that indicates that the users share a social media connection, that the users share common interests/tastes/preferences, that users are co-located within a same geographic region, or the like. As previously described, each user may be represented by a user node 304 in the graph 302, where the user node 304 is representative of a rating vector associated with the corresponding user. A cosine similarity or other similarity metric may be determined for rating vectors for different users to assess the degree of similarity between the users and to identify relationships between users. Relationships between POIs may be determined, for example, from predefined relationships between POIs (e.g., proximity between POIs), from social media data (e.g., a correlation between user reviews for different POIs), or the like. As previously described, each POI may be represented by a corresponding POI node 306 in the graph 302, where the POI node 306 is representative of a feature vector associated with the corresponding POI. Similar to user-to-user relationships, a cosine similarity or other similarity metric may be determined for feature vectors for different POIs to assess the degree of similarity between the POIs and to identify relationships between POIs.

The primitive graph generation module(s) 110 may also be configured to determine user-to-POI relationships from the raw data 106. As previously described, a user node 304 may correspond to a particular user and may be represented by a rating vector, where each dimension in the rating vector is indicative of a user rating (if provided) of a corresponding POI. If a user's rating vector indicates a positive rating or review for a particular POI, for example, the primitive graph generation module(s) 110 may include an edge 308 in the graph 302 to indicate that the user and the corresponding POI are related. If a user's rating vector does not include a rating or review for a particular POI (or possibly includes a negative rating or review), then no edge may be present in the primitive graph 302 between the user node 304 corresponding to the user and the POI node 306 corresponding to the POI.

Once the primitive graph 112 (e.g., the primitive user-POI bipartite graph 302) is constructed, the loss data prediction engine 102 may execute a loss data prediction algorithm to fill-in the primitive graph 112 with additional edges representing additional relationships gleaned between users and POIs. More specifically, computer-executable instructions of one or more graph filling module(s) 114 of the loss data prediction engine 102 may be executed at block 406 of the method 400 to execute a loss data prediction algorithm to obtain a filled graph 116 from the primitive graph 112. Referring to the example of FIG. 3, the graph filling module(s) 114 may execute the loss data prediction algorithm to transform the primitive user-POI bipartite graph 302 into the filled user-POI bipartite graph 310. In certain example embodiments, the primitive user-POI bipartite graph 302 may be an (m+n)×(m+n) sparse transition matrix, where m is the number of users and n is the number of POIs. Filling in the primitive user-POI bipartite graph 302 may thus be viewed as populating the sparse transition matrix with additional values.

In certain example embodiments, the loss data prediction algorithm executed by the graph filling module(s) 114 may be a random walk with restart (RWR) algorithm. Execution of the RWR algorithm may result in additional user-to-POI relationships being derived from existing relationships in the primitive user-POI bipartite graph 302. For example, a relationship between a particular user and a particular POI may be determined to exist via execution of the RWR algorithm based on existing relationships in the graph 302 between POIs and/or between users even when the rating vector for the particular user does not include any rating data for the particular POI.

According to an example mathematical formulation of the loss data prediction algorithm, the primitive user-POI bipartite graph 302 may be represented by $\tilde{M}$, which may be an (m+n)×(m+n) sparse transition matrix, where the value at the ith row and jth column of the matrix ($\tilde{M}_{ij}$) represents the extent of a relationship (if any) between node i and node j in the graph 302. The loss data prediction algorithm may then be given by the following iterative equation: $<r_{k(i+1)}> = c\tilde{M}<r_{ki}> + (1-c)<e>$, where $<r_{ki}>$ is an (m+n) vector that represents node k's relationship between m users and n POIs at the ith iteration, $<e>$ is an (m+n) vector where the kth element is one and other elements are zero, and c is a constant. When the iteration stabilizes, the vector $<r_{ki}>$ is close to the vector $<r_{k(i+1)}>$, and as a result, the node k's relationships with other node can be determined.

As previously noted, filling in the primitive user-POI bipartite graph 302 to obtain the filled bipartite graph 310 may include determining additional relationships between users and POIs that may not be present in the primitive graph 302 and representing any such additional relationships in the filled bipartite graph 310. For example, the filled bipartite graph 310 may include an edge 312 not present in the primitive bipartite graph 302. The edge 312 may represent a relationship between user A and POI 'a', which may be determined via execution of the loss data prediction algorithm. More generally, the dashed lines depicted in FIG. 3 are edges in the filled graph 310 that may represent additional user-to-POI relationships identified via execution of the loss data prediction algorithm on the primitive graph 302.

After the filled graph 116 (e.g., the filled user-POI bipartite graph 310) is obtained, a group-based sequential recommendation process may be executed using the filled graph 116 to determine a sequence of POIs to recommend to a group of users. Referring now to FIGS. 1, 2, and 5 in conjunction with one another, at block 502 of the method 500, a group sequential recommendation engine 104 may determine a user group 122. More specifically, computer-executable instructions of one or more group generation module(s) 120 provided as part of the group sequential recommendation engine 104 may be executed to determine the user group 122 (e.g., the example user group 202 depicted in FIG. 2) based at least in part on the raw user data 106. The user group 202 may be, for example, an existing social media group. As another non-limiting example, the user group 202 may be specified by one or more users in the group such as by an administrator of the group.

At block 504 of the method 500, the group sequential recommendation engine 104 may receive a current input context 134 for the identified group of users 122. Referring to FIG. 2 specifically, the group sequential recommendation engine 104 may receive an input context 206 corresponding to the user group 202. The input context 206 may include, for example, a real-time location associated with the user group 202. The input context 206 may also specify a period of time during which sequential POI recommendations are to be provided to the user group 202. In certain example embodiments, the input context 206 may be received from one or more user devices 204 associated with the user group 202. The user devices 204 may include, for example, user device 136. For example, the real-time location of the user group 202 may be determined based on Global Positioning System (GPS) data received from one or more of the user devices 204. The user devices 204 may include any suitable device including, without limitation, a smartphone, a tablet device, a desktop computer, a laptop computer, a wearable device, or the like.

At block 506 of the method 500, computer-executable instructions of the group sequential recommendation engine 104 may be executed to modify the filled graph 116 generated as a result of execution of the loss data prediction algorithm described earlier based at least in part on the current input context 134. Referring again to the example implementation depicted in FIG. 2, the group sequential recommendation engine 104 may modify the filled user-POI bipartite graph 310 generated via the loss data prediction process to obtain the user-POI bipartite graph 208 by including a user node 214 in the graph 208 that represents the initial group location as a current POI in the sequence of POIs to recommend. The initial group location (as well as subsequent new current POIs in the recommended sequence of POIs) may be represented as a corresponding user node in the graph 208 at each iteration of the sequential recommendation process because the current POI may impact the selection of the next POI in the sequence. Thus, the relationship of the current POI with other POIs is built into the graph 208 by including the user node 214 representing the current POI.

The user-POI bipartite graph 208 may include a set of user nodes 210 (including the current POI represented as user node 214) and a set of POI nodes 212. In certain example embodiments, the user-POI bipartite graph 310 received by the group sequential recommendation engine 104 may include nodes for more users than are present in the user group 202, in which case, the group sequential recommendation engine 104 may modify the graph 310 to include only those user nodes 210 corresponding to users in the user group 202 and related POI nodes 212. In other example embodiments, the group sequential recommendation engine 104 may construct the user-POI bipartite graph 208 for the group of users and related POIs responsive to receiving the indication of the user group 202 and the current input context 206.

At block 508 of the method 500, computer-executable instructions of one or more graph dimension reduction module(s) 118 provided as part of the group sequential recommendation engine 104 may be executed to convert the graph constructed or modified at block 506 of the method 500 into a homogenous node type graph 124. For example, the example user-POI bipartite graph 208 depicted in FIG. 2 may be converted into the example homogenous node type graph 216. The homogenous node type graph 216 includes a center node corresponding to the user node 214 representing the current POI. The current POI node 214 may be connected to the other user nodes 210 via corresponding edges. For example, the current POI node 214 corresponding to current POI 'a' may be connected to user node A, user node B, and user node C via respective edges.

The edge connecting the current POI node 214 with another user node 210 may represent another POI that is related to both the user represented by the user node 210 and the current POI represented by the current POI node 214. For instance, in the example homogenous node type graph 216, an edge 220 representing POI d' connects a user node representing user A and the current POI node 214 representing the current POI 'a'. This may reflect a determination that user A's tastes/preferences indicate a potential interest in POI 'd'. Such a determination may be made based at least in part on an analysis of the rating vector for user A and the feature vector for POI 'd', as previously described. In addition, the edge 220 may also indicate that many users select POI after selecting the current POI 'a'. Thus, the edge 220 may also reflect a sequential relationship between the current POI 'a' and the POI 'd'. Thus, in the homogenous node type graph 216, an edge between the current POI node 214 and a user node is indicative of two types of relationships (e.g., a user-to-POI relationship and a POI-to-POI relationship), while an edge between two user nodes 210 is indicative of a single type of relationship (e.g., a user-to-user relationship).

At block 510 of the method 500, computer-executable instructions of one or more minimum spanning tree generation module(s) 126 provided as part of the group sequential recommendation engine 104 may be executed to generate a minimum spanning tree 128 from the homogenous graph 124. An example minimum spanning tree 222 derived from the example homogenous node type graph 216 is depicted in FIG. 2. The minimum spanning tree 222 may also include the current POI node 214 as a center node, which may be connected by respective edges to each of the user nodes 210. Each edge in the minimum spanning tree 222 may represent a corresponding POI that is related to both a user node 210 and the current POI node 214 in the homogenous node type graph 216, potentially via an intervening user node 210.

For instance, user node A is connected to current POI node 214 via edge 220 representing POI 'd'. However, user node A is also connected to current POI node 214 via intervening user node B. That is, in the homogenous node type graph 216, user node A is connected to user node B via an edge representing POI 'c'. In addition, user node B is connected to current POI node 214 via an edge representing POI 'c'. Further, user node A is also connected to user node C via an edge representing POI 'c', which in turn, is connected to current POI node 214 via an edge also representing POI 'c'. As such, the minimum spanning tree 222 may reduce the number of edges in the homogenous graph 216 by directly connecting user node A to current POI node 214 using an edge representing POI 'c' and eliminating i) the edge representing POI 'd' that connects user node A and current POI node 214, ii) the edge representing POI 'c' that connects user node A with user node B in the homogenous node type graph 216, and iii) the edge representing POI 'c' connecting user node A with user node C.

At block 512 of the method 500, computer-executable instructions of one or more sequential POI determination module(s) 130 provided as part of the group sequential recommendation engine 104 may be executed to determine a next POI 132 in the sequence of POIs to recommend. In particular, referring again to FIG. 2, computer-executable instructions of the sequential POI determination module(s) 130 may be executed to determine a new current POI to recommend to the user group 202 in the sequence of recommended POIs based at least in part on an analysis of the minimum spanning tree 222. The new current POI may correspond to an edge that is most often represented in the minimum spanning tree 222. For instance, in the example implementation depicted in FIG. 2, the edge that is most represented in the minimum spanning tree 222 is an edge representative of the POI 'c'. As such, POI 'c' may be selected as the new current POI to recommend in the sequence of POIs, and the current POI node 214 representative of POI 'a' at the most recent iteration of the sequential recommendation process may be replaced with a new current POI node 224 representative of the next POI (e.g., POI c') selected in the sequence.

At block 514 of the method 500, computer-executable instructions of the sequential POI determination module(s) 130 may be executed to present an indication of the new current POI (e.g., POI 'c' in the example implementation of FIG. 2) to the user group 202 via, for example, one or more of the user devices 204. Then, at block 514 of the method 500, computer-executable instructions of the sequential POI determination module(s) 130 may be executed to update the current input context 206 to obtain an updated input context 226. The updated input context 226 may include the new current POI (e.g., POI 'c') as the current location of the user group 202.

At block 518 of the method 500, the group sequential recommendation engine 104 may determine whether stopping criteria is met for halting the iterative sequential POI recommendation process. The stopping criteria may include, for example, whether a remaining time for recommending a sequence of POIs to the user group 202 has expired. In response to a negative determination at block 518, the method 500 may again proceed iteratively from block 506, where the user-POI bipartite graph 208 may be modified to replace the current POI node 214 from the previous iteration with the new current POI node 224. The process may then continue with generation of a homogenous graph from the modified graph 208 and generation of a minimum spanning tree from the homogenous graph. The minimum spanning tree so generated may then be used to determine the next POI to recommend in the sequence. On the other hand, in response to a positive determination at block 518, the iterative sequential POI recommendation process may end.

One or more illustrative embodiments of the invention are described herein. Such embodiments are merely illustrative of the scope of this disclosure and are not intended to be limiting in any way. Accordingly, variations, modifications, and equivalents of embodiments disclosed herein are also within the scope of this disclosure.

Figure 6:
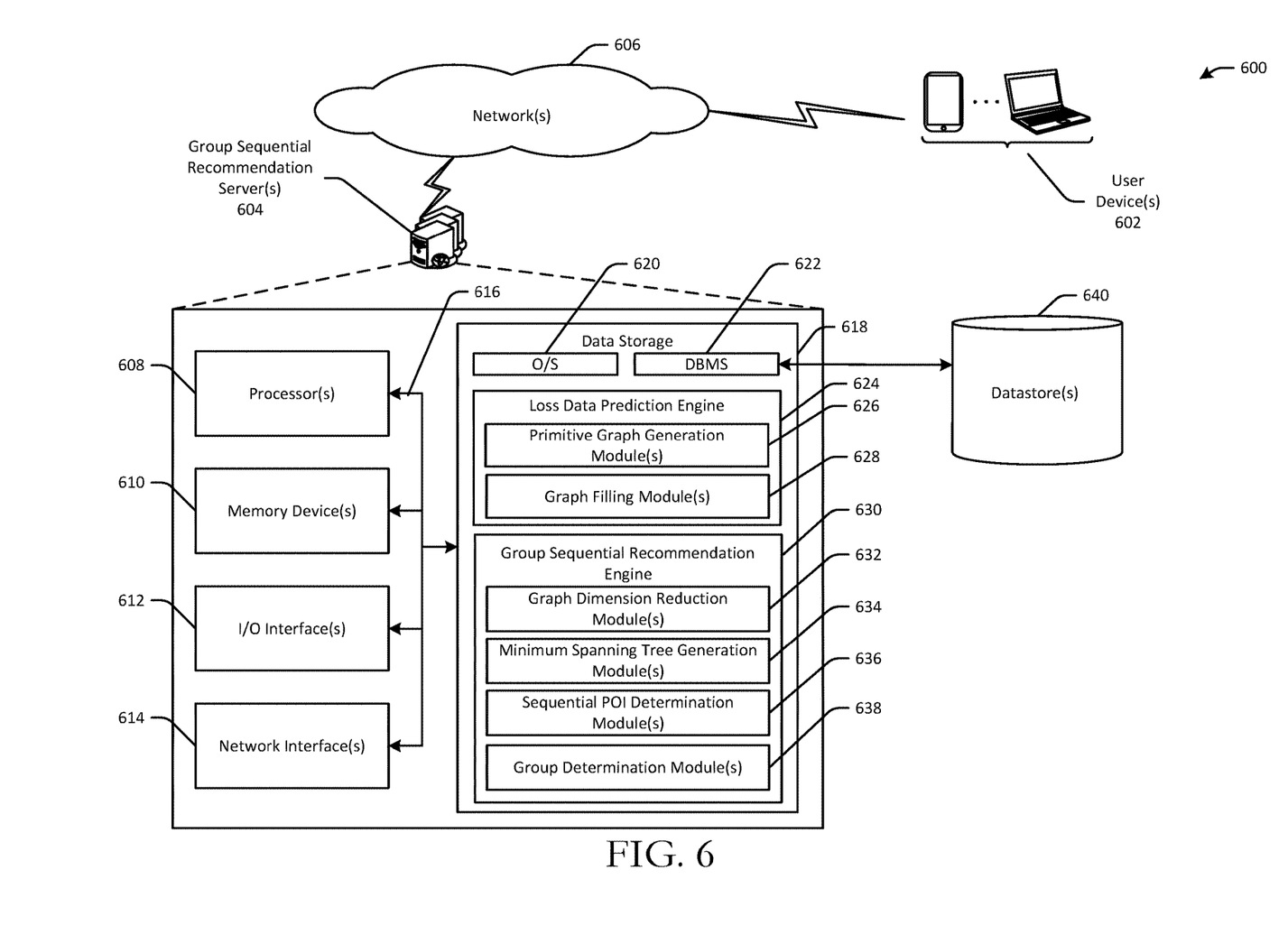
FIG. 6 is a schematic diagram of an illustrative networked architecture configured to implement one or more example embodiments.

FIG. 6 is a schematic diagram of an illustrative networked architecture 600 configured to implement one or more example embodiments. In the illustrative implementation depicted in FIG. 6, the networked architecture 600 includes one or more user devices 602 and one or more group sequential recommendation servers 604. The user device(s) 602 may include any of the types of devices described in connection with the user devices 204 depicted in FIG. 2. The user device(s) 602 may be configured to communicate with the group sequential recommendation server(s) 604 via one or more networks 606. In addition, the group sequential recommendation server(s) 604 and/or the user device(s) 602 may access one or more datastores 640 over the network(s) 606. The datastore(s) 640 may include any of the datastore(s) 108 and may store the raw user and POI data 106. While any particular component of the networked architecture 600 may be described herein in the singular, it should be appreciated that multiple instances of any such component may be provided, and functionality described in connection with a particular component may be distributed across multiple ones of such a component.

The network(s) 606 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 606 may have any suitable communication range associated therewith and may include, for example, global networks (e.g., the Internet), metropolitan area networks (MANs), wide area networks (WANs), local area networks (LANs), or personal area networks (PANs). In addition, the network(s) 606 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the group sequential recommendation server 604 may include one or more processors (processor(s)) 608, one or more memory devices 610 (generically referred to herein as memory 610), one or more input/output ("I/O") interface(s) 612, one or more network interfaces 614, and data storage 618. The group sequential recommendation server 604 may further include one or more buses 616 that functionally couple various components of the group sequential recommendation server 604. The user device 602 may include similar hardware, firmware, and/or software components as the group sequential recommendation server 604. In certain example embodiments, at least a portion of the processing performed by components of the group sequential recommendation server 604 (e.g., processing performed by program modules or engines of the group sequential recommendation server 604) may be performed in a distributed manner by the user device 602 and the group sequential recommendation server 604.

The bus(es) 616 may include at least one of a system bus, a memory bus, an address bus, or a message bus, and may permit the exchange of information (e.g., data (including computer-executable code), signaling, etc.) between various components of the group sequential recommendation server 604. The bus(es) 616 may include, without limitation, a memory bus or a memory controller, a peripheral bus, an accelerated graphics port, and so forth. The bus(es) 616 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 610 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 610 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 610 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 618 may include removable storage and/or non-removable storage including, but not limited to, magnetic storage, optical disk storage, and/or tape storage. The data storage 618 may provide non-volatile storage of computer-executable instructions and other data. The memory 610 and the data storage 618, removable and/or non-removable, are examples of computer-readable storage media (CRSM) as that term is used herein.

The data storage 618 may store computer-executable code, instructions, or the like that may be loadable into the memory 610 and executable by the processor(s) 608 to cause the processor(s) 608 to perform or initiate various operations. The data storage 618 may additionally store data that may be copied to memory 610 for use by the processor(s) 608 during the execution of the computer-executable instructions. Moreover, output data generated as a result of execution of the computer-executable instructions by the processor(s) 608 may be stored initially in memory 610 and may ultimately be copied to data storage 618 for non-volatile storage.

More specifically, the data storage 618 may store one or more operating systems (O/S) 620; one or more database management systems (DBMS) 622 configured to access the memory 610 and/or the datastore(s) 636; and one or more program modules, applications, engines, managers, computer-executable code, scripts, or the like such as, for example, a loss data prediction engine 624 and a group sequential recommendation engine 630. The loss data prediction engine 624 may further include one or more primitive graph generation modules 626 and one or more graph filling modules 628. The group sequential recommendation engine 630 may include one or more graph dimension reduction module(s) 632, one or more minimum spanning tree generation modules 634, one or more sequential POI determination modules 636, and one or more group determination modules 638. Any of the components depicted as being stored in data storage 618 may include any combination of software, firmware, and/or hardware. The software and/or firmware may include computer-executable instructions (e.g., computer-executable program code) that may be loaded into the memory 610 for execution by one or more of the processor(s) 608 to perform any of the operations described earlier in connection with correspondingly named modules, engines, managers, or the like.

Although not depicted in FIG. 6, the data storage 618 may further store various types of data utilized by components of the group sequential recommendation server 604 (e.g., any of the data depicted in FIGS. 1-3). Any data stored in the data storage 618 may be loaded into the memory 610 for use by the processor(s) 608 in executing computer-executable instructions. In addition, any data stored in the data storage 618 may potentially be stored in the datastore(s) 640 and may be accessed via the DBMS 622 and loaded in the memory 610 for use by the processor(s) 608 in executing computer-executable instructions.

The processor(s) 608 may be configured to access the memory 610 and execute computer-executable instructions loaded therein. For example, the processor(s) 608 may be configured to execute computer-executable instructions of the various program modules, applications, engines, managers, or the like of the group sequential recommendation server 604 to cause or facilitate various operations to be performed in accordance with one or more embodiments. The processor(s) 608 may include any suitable processing unit capable of accepting data as input, processing the input data in accordance with stored computer-executable instructions, and generating output data. The processor(s) 608 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 608 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 608 may be capable of supporting any of a variety of instruction sets.

Referring now to other illustrative components depicted as being stored in the data storage 618, the O/S 620 may be loaded from the data storage 618 into the memory 610 and may provide an interface between other application software executing on the group sequential recommendation server 604 and hardware resources of the group sequential recommendation server 604. More specifically, the O/S 620 may include a set of computer-executable instructions for managing hardware resources of the group sequential recommendation server 604 and for providing common services to other application programs. In certain example embodiments, the O/S 620 may include or otherwise control execution of one or more of the program modules, engines, managers, or the like depicted as being stored in the data storage 618. The O/S 620 may include any operating system now known or which may be developed in the future including, but not limited to, any server operating system, any mainframe operating system, or any other proprietary or non-proprietary operating system.

The DBMS 622 may be loaded into the memory 610 and may support functionality for accessing, retrieving, storing, and/or manipulating data stored in the memory 610, data stored in the data storage 618, and/or data stored in the datastore(s) 636. The DBMS 622 may use any of a variety of database models (e.g., relational model, object model, etc.) and may support any of a variety of query languages. The DBMS 622 may access data represented in one or more data schemas and stored in any suitable data repository. External datastore(s) 640 that may be accessible by the group sequential recommendation server 604 via the DBMS 622 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the group sequential recommendation server 604, the input/output (I/O) interface(s) 612 may facilitate the receipt of input information by the group sequential recommendation server 604 from one or more I/O devices as well as the output of information from the group sequential recommendation server 604 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the group sequential recommendation server 604 or may be separate. The I/O devices may further include, for example, any number of peripheral devices such as data storage devices, printing devices, and so forth.

The I/O interface(s) 612 may also include an interface for an external peripheral device connection such as universal serial bus (USB), FireWire, Thunderbolt, Ethernet port or other connection protocol that may connect to one or more networks. The I/O interface(s) 612 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The group sequential recommendation server 604 may further include one or more network interfaces 614 via which the group sequential recommendation server 604 may communicate with any of a variety of other systems, platforms, networks, devices, and so forth. The network interface(s) 614 may enable communication, for example, with one or more other devices via one or more of the network(s) 606.

It should be appreciated that the engines and program modules depicted in FIG. 6 as being stored in the data storage 618 are merely illustrative and not exhaustive and that processing described as being supported by any particular engine or module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the group sequential recommendation server 604, a user device 602, and/or other computing devices accessible via the network(s) 606, may be provided to support functionality provided by the modules depicted in FIG. 6 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, engines or program modules that support the functionality described herein may be executable across any number of cluster members in accordance with any suitable computing model such as, for example, a client-server model, a peer-to-peer model, and so forth. In addition, any of the functionality described as being supported by any of the engines or modules depicted in FIG. 6 may be implemented, at least partially, in hardware and/or firmware across any number of devices.

It should further be appreciated that the group sequential recommendation server 604 and/or the user device 602 may include alternate and/or additional hardware, software, or firmware components beyond those described or depicted without departing from the scope of the disclosure. More particularly, it should be appreciated that software, firmware, or hardware components depicted as forming part of the group sequential recommendation server 604 are merely illustrative and that some components may not be present or additional components may be provided in various embodiments. While various illustrative modules have been depicted and described as software modules stored in data storage 618, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular engine or module may, in various embodiments, be provided at least in part by one or more other engines or modules. Further, one or more depicted engines or modules may not be present in certain embodiments, while in other embodiments, additional program modules and/or engines not depicted may be present and may support at least a portion of the described functionality and/or additional functionality.

One or more operations of the methods 400 or 500 may be performed by a group sequential recommendation server 604 having the illustrative configuration depicted in FIG. 6, or more specifically, by one or more program modules, engines, applications, or the like executable on such a device. It should be appreciated, however, that such operations may be implemented in connection with numerous other device configurations.

The operations described and depicted in the illustrative methods of FIGS. 4-5 may be carried out or performed in any suitable order as desired in various example embodiments of the invention. Additionally, in certain example embodiments, at least a portion of the operations may be carried out in parallel. Furthermore, in certain example embodiments, less, more, or different operations than those depicted in FIGS. 4-5 may be performed.

Although specific embodiments of the invention have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with example embodiments, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for generating group-based sequential point-of-interest(POI) recommendations, the method comprising:
    determining, by a computer processor, a group of users;
    receiving, by the computer processor, a current input context for the group of users, the current input context including a current group location for the group of users;
    constructing, by the computer processor, a graph for the group of users, wherein the graph comprises a set of user nodes and a set of POI nodes, wherein each user node is associated with one or more POI nodes, and wherein the current group location is represented in the graph by a current POI node indicative of a current POI in a sequence of POIs, wherein the graph comprises a primitive user-POI bipartite graph;
    creating a filled user-POI bipartite graph from the primitive user-POI bipartite graph by adding edges to the primitive user-POI bipartite graph, wherein all edges of the filled user-POI bipartite graph couple a single user node or the current POI node to a single POI node;
    performing, by the computer processor, an iterative process to determine the sequence of POIs to recommend to the group of users, wherein performing the iterative process comprises:
        converting the filled user-POI bipartite graph into a homogenous node type graph comprising a center node, the set of user nodes, and a set of second edges comprising one or more inner edges and one or more outer edges, wherein the center node comprises the current POI node, coupling the current POI node to each respective user node of the set of users nodes by a respective inner edge of the one or more inner edges and coupling each respective user node to a second user node by a respective outer edge of the one or more outer edges such that all second edges couple a single user node to the current POI node or to another user node, wherein an inner edge between the center node and a respective user node comprises a second POI that satisfies both a user-to-POI relationship comprising a preference by the respective user associated with the user node for the second POI and a POI-to-POI relationship comprising a sequence preference of other users for selecting the second POI after visiting the current POI, and wherein an outer edge between two respective user nodes encodes only a user-to-user relationship;

generating a minimum spanningtree from the homogenous node type graph;

determining, by the computer processor, a new current POI in the sequence of POIs based at least in part on the minimum spanning tree;

presenting, by the computer processor, an indication of the new current POI to the group of users;

updating, by the computer processor, the current input context;

modifying, by the computer processor, the graph to obtain a modified graph, wherein modifying the graph comprises replacing the node indicative of the current POI with a node indicative of the new current POI; and repeating, by the computer processor, the iterative process until stopping criteria is met.

2. The computer-implemented method of claim 1, wherein performing the iterative process further comprises:

determining, by the computer processor, that the stopping criteria is met, wherein determining that the stopping criteria is met comprises determining that a remaining time for recommending the sequence of POIs to the group of users has expired; and terminating, by the computer processor, the iterative process.

3. The computer-implemented method of claim 1, wherein constructing the graph for the group of users comprises:

obtaining, by the computer processor, raw data for the group of users and for a set of POIs;

generating, by the computer processor, the primitive user-POI bipartite graph based at least in part on the raw data; and executing, by the computer processor, a loss data prediction algorithm to obtain the filled user-POI bipartite graph from the primitive user-POI bipartite graph.

4. The computer-implemented method of claim 3, wherein executing the loss data prediction algorithm comprises:

determining, by the computer processor, one or more additional associations between at least one of the user nodes and at least one of the POI nodes; and adding, by the computer processor, the one or more additional associations to the primitive user-POI bipartite graph to obtain the filled user-POI bipartite graph.

5. The computer-implemented method of claim 3, wherein generating the primitive user-POI bipartite graph comprises:

determining, by the computer processor, a first set of relationships among the group of users;

determining, by the computer processor, a second set of relationships between the group of users and the set of POIs;

determining, by the computer processor, a third set of relationships among the set of POIs; and generating, by the computer processor, the primitive user-POI bipartite graph based at least in part on the first set of relationships, the second set of relationships, and the third set of relationships.

6. The computer-implemented method of claim 1, wherein determining the new current POI using the minimum spanning tree comprises determining, by the computer processor, that the new current POI is represented by a respective edge between the current POI node and each of one or more of the user nodes in the minimum spanning tree.

7. A system for generating group-based sequential point-of-interest (POI) recommendations, the system comprising:

at least one memory storing computer-executable instructions; and at least one processor configured to access the at least one memory and execute the computer-executable instructions to:

determine a group of users;

receive a current input context for the group of users, the current input context including a current group location for the group of users;

construct a graph for the group of users, wherein the graph comprises a set of user nodes and a set of POI nodes, wherein each user node is associated with one or more POI nodes, and wherein the current group location is represented in the graph by a current POI node indicative of a current POI in a sequence of POIs, wherein the graph comprises a primitive user-POI bipartite graph;

creating a filled user-POI bipartite graph from the primitive user-POI bipartite graph by adding edges to the primitive user-POI bipartite graph, wherein all edges of the filled user-POI bipartite graph couple a single user node or the current POI node to a single POI node;

perform an iterative process to determine the sequence of POIs to recommend to the group of users, wherein the at least one processor is configured to perform the iterative process by executing the computer-readable instructions to:

converting the filled user-POI bipartitegraph into a homogenous node type graph comprising a center node, the set of user nodes, and a set of second edges comprising one or more inner edges and one or more outer edges, wherein the center node comprises the current POI node, coupling the current POI node to each respective user node of the set of users nodes by a respective inner edge of the one or more inner edges and coupling each respective user node to a second user node by a respective outer edge of the one or more outer edges such that all second edges couple a single user node to the current POI node or to another user node, wherein an inner edge between the center node and a respective user node comprises a second POI that satisfies both a user-to-POI relationship comprising a preference by the respective user associated with the user node for the second POI and a POI-to-POI relationship comprising a sequence preference of other users for selecting the second POI after visiting the current POI, and wherein an outer edge between two respective user nodes encodes only a user-to-user relationship;

generating a minimum spanning tree from the homogenous node type graph;

determine a new current POI in the sequence of POIs based at least in part on the minimum spanning tree;

present an indication of the new current POI to the group of users;

update the current input context;
modify the graph to obtain a modified graph, wherein modifying the graph comprises replacing the node indicative of the current POI with a node indicative of the new current POI; and
repeat the iterative process until stopping criteria is met.

8. The system of claim 7, wherein the at least one processor is further configured to perform the iterative process by executing the computer-executable instructions to:
determine that the stopping criteria is met, wherein determining that the stopping criteria is met comprises determining that a remaining time for recommending the sequence of POIs to the group of users has expired; and
terminate the iterative process.

9. The system of claim 7, wherein the at least one processor is configured to construct the graph for the group of users by executing the computer-executable instructions to:
obtain raw data for the group of users and for a set of POIs;
generate the primitive user-POI bipartite graph based at least in part on the raw data; and
execute a loss data prediction algorithm to obtain the filled user-POI bipartite graph from the primitive user-POI bipartite graph.

10. The system of claim 9, wherein the at least one processor is configured to execute the loss data prediction algorithm by executing the computer-executable instructions to:
determine one or more additional associations between at least one of the user nodes and at least one of the POI nodes; and
add the one or more additional associations to the primitive user-POI bipartite graph to obtain the filled user-POI bipartite graph.

11. The system of claim 9, wherein the at least one processor is configured to generate the primitive user-POI bipartite graph by executing the computer-executable instructions to:
determine a first set of relationships among the group of users;
determine a second set of relationships between the group of users and the set of POIs;
determine a third set of relationships among the set of POIs; and
generate the primitive user-POI bipartite graph based at least in part on the first set of relationships, the second set of relationships, and the third set of relationships.

12. The system of claim 7, wherein the at least one processor is configured to determine the new current POI using the minimum spanning tree by executing the computer-executable instructions to determine that the new current POI is represented by a respective edge between the current POI node and each of one or more of the user nodes in the minimum spanning tree.

13. A computer program product for generating group-based sequential point-of-interest(POI) recommendations, the computer program product comprising a non-transitory storage medium readable by a processing circuit, the storage medium storing instructions executable by the processing circuit to cause a method to be performed, the method comprising:
determining a group of users;
receiving a current input context for the group of users, the current input context including a current group location for the group of users;
constructing a graph for the group of users, wherein the graph comprises a set of user nodes and a set of POI nodes, wherein each user node is associated with one or more POI nodes, and wherein the current group location is represented in the graph by a current POI node indicative of a current POI in a sequence of POIs, wherein the graph comprises a primitive user-POI bipartite graph;
creating a filled user-POI bipartite graph from the primitive user-POI bipartite graph by adding edges to the primitive user-POI bipartite graph, wherein all edges of the filled user-POI bipartite graph couple a single user node or the current POI node to a single POI node;
performing an iterative process to determine the sequence of POIs to recommend to the group of users, wherein performingthe iterative process comprises:
converting the filled user-POI bipartite graph into a homogenous node type graph comprising a center node, the set of user nodes, and a set of second edges comprising one or more inner edges and one or more outer edges, wherein the center node comprises the current POI node, coupling the current POI node to each respective user node of the set of users nodes by a respective inner edge of the one or more inner edges and coupling each respective user node to a second user node by a respective outer edge of the one or more outer edges such that all second edges couple a single user node to the current POI node or to another user node,
wherein an inner edge between the center node and a respective user node comprises a second POI that satisfies both a user-to-POI relationship comprising a preference by the respective user associated with the user node for the second POI and a POI-to-POI relationship comprising a sequence preference of other users for selecting the second POI after visiting the current POI, and wherein an outer edge between two respective user nodes encodes only a user-to-user relationship;
generating a minimum spanning tree from the homogenous node type graph;
determining a new current POI in the sequence of POIs based at least in part on the minimum spanning tree;
presenting an indication of the new current POI to the group of users;
updating the current input context;
modifying the graph to obtain a modified graph, wherein modifying the graph comprises replacing the node indicative of the current POI with a node indicative of the new current POI; and
repeating the iterative process until stopping criteria is met.

14. The computer program product of claim 13, wherein constructing the graph for the group of users comprises:
obtaining raw data for the group of users and for a set of POIs;
generating the primitive user-POI bipartite graph based at least in part on the raw data; and
executing a loss data prediction algorithm to obtain the filled user-POI bipartite graph from the primitive user-POI bipartite graph.

15. The computer program product of claim 14, wherein executing the loss data prediction algorithm comprises:
- determining one or more additional associations between at least one of the user nodes and at least one of the POI nodes; and
- adding the one or more additional associations to the primitive user-POI bipartite graph to obtain the filled user-POI bipartite graph.

16. The computer program product of claim 14, wherein generating the primitive user-POI bipartite graph comprises:
- determining a first set of relationships among the group of users;
- determining a second set of relationships between the group of users and the set of POIs;
- determining a third set of relationships among the set of POIs; and
- generating the primitive user-POI bipartite graph based at least in part on the first set of relationships, the second set of relationships, and the third set of relationships.

17. The computer program product of claim 13, wherein determining the new current POI using the minimum spanning tree comprises determining that the new current POI is represented by a respective edge between the current POI node and each of one or more of the user nodes in the minimum spanning tree.

* * * * *